US012026547B2

(12) United States Patent
Liang et al.

(10) Patent No.: US 12,026,547 B2
(45) Date of Patent: Jul. 2, 2024

(54) METHOD AND SYSTEM FOR ARRANGING BUSINESS PROCESS, COMPUTING DEVICE, AND NON-TRANSITORY COMPUTER READABLE STORAGE MEDIUM

(71) Applicant: BEIJING BAIDU NETCOM SCIENCE AND TECHNOLOGY CO., LTD., Beijing (CN)

(72) Inventors: Jun Liang, Beijing (CN); Leding Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 473 days.

(21) Appl. No.: 17/349,788

(22) Filed: Jun. 16, 2021

(65) Prior Publication Data

US 2021/0311780 A1    Oct. 7, 2021

(30) Foreign Application Priority Data

Nov. 30, 2020   (CN) .......................... 202011385126.7

(51) Int. Cl.
*G06F 9/48*       (2006.01)
*G06F 16/22*      (2019.01)
(Continued)

(52) U.S. Cl.
CPC ............ *G06F 9/4881* (2013.01); *G06F 16/22* (2019.01); *G06F 16/258* (2019.01); *G06Q 10/10* (2013.01); *G16Y 10/75* (2020.01); *H04L 67/10* (2013.01)

(58) Field of Classification Search
CPC ...... G06F 9/4881; G06F 16/22; G06F 16/258; G06F 9/5027; G06F 9/5072; G06F 8/20;
(Continued)

(56) References Cited

U.S. PATENT DOCUMENTS 10,382,358 B1    8/2019  Jain et al.
2001/0023414 A1*  9/2001  Kumar ................... G06Q 10/06
                                                    708/170
(Continued)

FOREIGN PATENT DOCUMENTS

CN         102034151 A      4/2011
CN         106096864 A      11/2016
(Continued)

OTHER PUBLICATIONS

Sun Li, "Research on Industrial Big Data Service for Edge Intelligence Industrial", School of Economics and Management, 2020, pp. 1-3.

(Continued)

*Primary Examiner* — Tuan C Dao
(74) *Attorney, Agent, or Firm* — Seed IP Law Group LLP

(57) ABSTRACT

A method and a system for arranging business process, a computing device, and a non-transitory computer readable storage medium are provided. The method includes: receiving an application module and a business process rule that are transmitted by a user terminal, wherein the application module is configured to indicate a processing logic in a link in a business process, and wherein the business process rule is configured to indicate a processing rule of the application module; determining a target edge device corresponding to the application module; and transmitting the application module and the business process rule to the target edge device for the target edge device to execute the application module according to the business process rule.

15 Claims, 7 Drawing Sheets

(51) Int. Cl.
*G06F 16/25* (2019.01)
*G06Q 10/10* (2023.01)
*G16Y 10/75* (2020.01)
*H04L 67/10* (2022.01)

(58) Field of Classification Search
CPC .. G06F 9/547; G06Q 10/10; G06Q 10/06316; H04L 67/10; H04L 67/02; H04L 67/51
See application file for complete search history.

(56) References Cited

U.S. PATENT DOCUMENTS

| | | | |
|---|---|---|---|
| 2002/0010798 A1* | 1/2002 | Ben-Shaul | H04L 67/52 |
| | | | 707/E17.116 |
| 2003/0115281 A1* | 6/2003 | McHenry | H04L 67/2895 |
| | | | 709/213 |
| 2004/0002957 A1* | 1/2004 | Chaudhuri | G06F 16/284 |
| 2005/0114367 A1* | 5/2005 | Serebrennikov | G06Q 20/34 |
| | | | 707/E17.115 |
| 2005/0154746 A1* | 7/2005 | Liu | G06F 16/3326 |
| 2006/0190570 A1* | 8/2006 | Booth, III | H04L 12/4691 |
| | | | 709/220 |
| 2008/0008104 A1* | 1/2008 | Previdi | H04L 45/04 |
| | | | 370/255 |
| 2011/0010016 A1* | 1/2011 | Giroti | G05B 13/02 |
| | | | 700/286 |
| 2011/0246530 A1* | 10/2011 | Malafsky | G06N 5/022 |
| | | | 707/794 |
| 2014/0236881 A1 | 8/2014 | Meda et al. | |
| 2015/0043590 A1* | 2/2015 | Pan | H04L 45/304 |
| | | | 370/392 |
| 2015/0256874 A1* | 9/2015 | Kim | H04N 21/4627 |
| | | | 725/151 |
| 2015/0286934 A1* | 10/2015 | Rasband | G06F 18/00 |
| 2015/0312125 A1 | 10/2015 | Subramanian et al. | |
| 2016/0065386 A1* | 3/2016 | Hari | H04L 41/40 |
| | | | 370/254 |
| 2016/0371316 A1* | 12/2016 | Okanohara | G06N 3/044 |
| 2017/0060574 A1* | 3/2017 | Malladi | H04W 4/70 |
| 2018/0024851 A1 | 1/2018 | Barker et al. | |
| 2018/0129684 A1* | 5/2018 | Wilson | G06F 16/254 |
| 2018/0302320 A1* | 10/2018 | Aranha | H04L 45/302 |
| 2018/0373418 A1 | 12/2018 | Chen et al. | |
| 2019/0036779 A1* | 1/2019 | Bajaj | H04L 41/0816 |
| 2019/0158300 A1 | 5/2019 | Sabella et al. | |
| 2019/0171442 A1* | 6/2019 | Machida | H04L 67/1031 |
| 2020/0084126 A1* | 3/2020 | Teodoro | H04L 43/14 |
| 2020/0177589 A1* | 6/2020 | Mangalvedkar | H04W 4/50 |

FOREIGN PATENT DOCUMENTS

| | | |
|---|---|---|
| CN | 107886238 A | 4/2018 |
| CN | 110189013 A | 8/2019 |
| CN | 110531989 A | 12/2019 |
| CN | 110659330 A | 1/2020 |
| CN | 110768914 A | 2/2020 |
| CN | 111164952 A | 5/2020 |
| CN | 111200528 A | 5/2020 |
| CN | 111355610 A | 6/2020 |
| CN | 111629040 A | 9/2020 |
| CN | 111682973 A | 9/2020 |
| CN | 111800283 A | 10/2020 |

OTHER PUBLICATIONS

Zhang Jingyi et al., "On Choreography Model Based Business Process Monitoring Technique in Multi-Party Collaboration Application and Its Implementation", School of Information Science and Engineering, 2013, pp. 1-5.

Longye Tang et al., "Business-Aware ERP Cloud Software Evolution", Department of Info & Comp Science, pp. 1-6.

\* cited by examiner

METHOD AND SYSTEM FOR ARRANGING BUSINESS PROCESS, COMPUTING DEVICE, AND NON-TRANSITORY COMPUTER READABLE STORAGE MEDIUM

CROSS-REFERENCE TO RELATED APPLICATION

This application claims priority to and benefits of Chinese Patent Application No. CN202011385126.7, filed on Nov. 30, 2020, the entire content of which is incorporated herein by reference.

BACKGROUND

Technical Field

The present disclosure relates to the technical fields of computers, cloud computing and edge computing, and more particularly, to a method and a system for arranging business process, a computing device, and a non-transitory computer readable storage medium.

Description of the Related Art

With the development of Internet of things and a chip technology, the processing capacity of an edge device becomes stronger and stronger, such that more and more business processes are processed by the edge device. In the related art, main functions of an edge computing platform focus on aspects such as device management, cloud-edge collaboration and application issuance.

BRIEF SUMMARY

According to an aspect of embodiments of the present disclosure, a method for arranging business process is provided. The method comprises:
  receiving an application module and a business process rule that are transmitted by a user terminal, wherein the application module is configured to indicate a processing logic in a link in a business process, and wherein the business process rule is configured to indicate a processing rule of the application module;
  determining a target edge device corresponding to the application module; and
  transmitting the application module and the business process rule to the target edge device for the target edge device to execute the application module according to the business process rule.

According to an aspect of embodiments of the present disclosure, a method for arranging business process is provided. The method comprises:
  receiving an application module and a business process rule that are transmitted by a server, wherein the business process rule is configured to indicate a processing rule of the application module;
  parsing the application module and the business process rule; and
  executing the application module according to the parsed business process rule.

According to an aspect of embodiments of the present disclosure, a system for arranging business process is provided. The system comprises:
  a server, configured to: receive an application module and a business process rule that are transmitted by a user terminal, wherein the application module is configured to indicate a processing logic in a link in a business process, and wherein the business process rule is configured to indicate a processing rule of the application module; determine a target edge device corresponding to the application module; and transmit the application module and the business process rule to the target edge device for the target edge device to execute the application module according to the business process rule; and
  one or more edge devices including the target edge device, wherein each of the one or more edge devices is configured to interact with the server through a protocol, and wherein each of the one or more edge devices is configured to: receive the application module and the business process rule that are transmitted by the server; parse the application module and the business process rule; and execute the application module according to the parsed business process rule.

According to an aspect of embodiments of the present disclosure, a computing device is provided. The computing device comprises:
  one or more processors; and
  a memory storing one or more programs configured to be executed by the one or more processors, wherein the one or more programs comprise instructions for:
  receiving an application module and a business process rule that are transmitted by a user terminal, wherein the application module is configured to indicate a processing logic in a link in a business process, and wherein the business process rule is configured to indicate a processing rule of the application module;
  determining a target edge device corresponding to the application module; and
  transmitting the application module and the business process rule to the target edge device for the target edge device to execute the application module according to the business process rule.

According to an aspect of embodiments of the present disclosure, a computing device is provided. The computing device comprises:
  one or more processors; and
  a memory storing one or more programs configured to be executed by the one or more processors, wherein the one or more programs comprise instructions for:
  receiving an application module and a business process rule that are transmitted by a server, wherein the business process rule is configured to indicate a processing rule of the application module;
  parsing the application module and the business process rule; and
  executing the application module according to the parsed business process rule.

According to an aspect of embodiments of the present disclosure, a non-transient computer readable storage medium is provided. The non-transient computer readable storage medium stores one or more programs, the one or more programs comprising instructions, which when executed by one or more processors of an electronic device, cause the electronic device to:
  receive an application module and a business process rule that are transmitted by a user terminal, wherein the application module is configured to indicate a processing logic in a link in a business process, and wherein the business process rule is configured to indicate a processing rule of the application module;
  determine a target edge device corresponding to the application module; and transmit the application module and the business process rule to the target edge device for the target edge device to execute the application module according to the business process rule.

According to an aspect of embodiments of the present disclosure, a non-transient computer readable storage medium is provided. The non-transient computer readable storage medium stores one or more programs, the one or more programs comprising instructions, which when executed by one or more processors of an electronic device, cause the electronic device to:

receive an application module and a business process rule that are transmitted by a server, wherein the business process rule is configured to indicate a processing rule of the application module;

parse the application module and the business process rule; and execute the application module according to the parsed business process rule.

BRIEF DESCRIPTION OF THE SEVERAL VIEWS OF THE DRAWINGS

The drawings, which exemplarily illustrate embodiments and constitute a part of the specification, together with the text description of the specification, serve to explain some implementations of the embodiments. The illustrated embodiments are for illustrative purposes only and do not limit the scope of the claims. Throughout the drawings, the same reference signs denote similar but not necessarily the same elements, in which:

DETAILED DESCRIPTION

Figure 1:
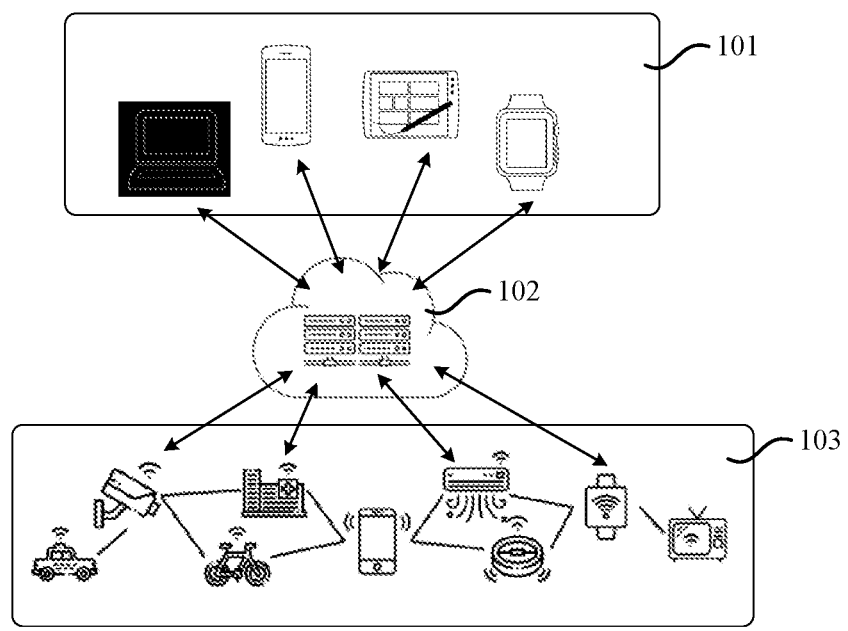
FIG. 1 is a schematic diagram of a system, in which various methods and apparatuses described herein may be implemented, according to some embodiments of the present disclosure.

In order to enable those skilled in the art to better understand the solution of the present disclosure, the technical solutions of embodiments of the present disclosure will be described clearly and comprehensively with reference to the drawings in the embodiments of the present disclosure. The described embodiments are merely part of the embodiments of the present disclosure, rather than all of the embodiments. Based on the embodiments of the present disclosure, all the other embodiments that could be obtained by those skilled in the art without paying creative labor shall fall into the protection scope of the present disclosure.

The terms "first" and "second" and the like in the description, claims and drawings of the present disclosure are used to distinguish similar objects, and are not necessarily used to describe a specific sequence or order. It should be understood that, the numbers used in this way may be interchanged under appropriate circumstances so that the embodiments of the present disclosure described herein can be implemented in a sequence other than those illustrated or described herein. In addition, the terms "including" and "having" and any variations thereof are intended to cover non-exclusive inclusions. For example, the process, method, system, product or device that includes a series of steps or units is not necessarily limited to those steps or units clearly listed, but may include other steps or units that are not clearly listed or are inherent to the process, method, product or device.

Cloud computing refers to a technical system in which an elastically extendable shared physical or virtual resource pool is accessed by virtue of a network, and resources may be deployed and managed as required in a self-service way. Resources may include a server, an operating system, a network, software, an application, a storage device and the like. By using a cloud computing technology, the efficient and strong data processing capacity may be provided for technical applications such as artificial intelligence, block chains, and model training. The cloud computing located in a core network of a data center is configured to collect data of a terminal by network devices layer upon layer and parse big data by virtue of strong storing and computing capacities.

Compared with the cloud computing, edge computing provides a cloud service and an IT environmental service at an edge side of a network for an application developer and a service provider, and aims at providing computation, storage and network bandwidths at a place close to data input or a user. By using the edge computing, real-time and short-period data analysis can be performed, real-time intelligent processing and execution of local data can be performed more efficiently, and the data traffic in the network and the workload of the cloud can be relieved.

With the development of Internet of things and a chip technology, the processing capacity of a device such as an edge device becomes stronger and stronger, such that more and more matters are processed by the edge device. However, the edge device itself cannot perform arranging business process and needs to integrate corresponding message queuing telemetry transport (MQTT) protocol services, Web services, remote procedure call (RPC), WebSocket and the like, which leads to high development cost, complex business logic and complex process deployment.

Therefore, embodiments of the present disclosure provide a method for arranging business process which can realize the arrangement of business processes at a server and the transmission of the arranged business processes to the edge device, so that the edge device can execute the business processes. Therefore, there is no need to integrate the corresponding services in the edge device, nor to develop a corresponding program for each business process, thus reducing the development cost.

FIG. 1 shows a schematic diagram of a system 100, in which various methods and apparatuses described herein may be implemented, according to embodiments of the present disclosure. As shown in FIG. 1, the system 100 includes a user terminal 101, a server 102 and an edge device 103. The number of edge devices may be one or more.

In some embodiments, the server 102 may provide software applications or other services which may include a non-virtual environment and a virtual environment. In some embodiments, these services may be provided as a web-based service or cloud service, for example, the services are provided to the user terminal 101 under Software-as-a-service (SaaS) model. In some examples, the server 102 may be a cloud of an edge computing system.

In a configuration shown in FIG. 1, the server 102 may include one or more components for achieving functions executed by the server 102. These components may include a software component, a hardware component or a combination thereof executed by one or more processors. A user of the user terminal 101 may interact with the server 102 by sequentially utilizing one or more client application programs so as to utilize services provided by these components. It should be understood that it is possible to provide various different system configurations which may be different from the configuration of the system 100. Therefore, FIG. 1 is an example of the system for implementing the various methods described herein and does not aim at limitation.

The user may upload and manage the application module by using the user terminal 101 and deploy a business processing process rule. The user terminal 101 may provide an interface that enables the user of the user terminal 101 to interact with a client device. The user terminal 101 may also output information to the user through the interface.

In some embodiments, the user terminal 101 may include various types of computing devices, such as a portable handheld device, a general-purpose computer such as a personal computer and a laptop computer, a workstation computer, a wearable device, a game system, a thin client, a messaging device, a sensor or other sensing device and the like. These computing devices are capable of operating various types and versions of software application programs and operating systems, such as Microsoft Windows, Apple iOS, UNIX-like operating systems, Linux operating systems, Linux-like operating systems such as Google Chrome OS and the like. These computing devices may include various types of mobile operating systems such as Microsoft Windows Mobile OS, iOS, Windows Phone, Android and the like. The portable handheld device may be a cellular phone, a smart phone, a tablet computer, a personal digital assistant (PDA) and the like. The wearable device may be a head-mounted display and other device. The game system may include various handheld game devices supporting the Internet and the like. A client device may use various communication protocols and can execute a variety of different application programs such as Internet-related application programs, communication application programs such as E-mail application programs, short message service (SMS) application programs and the like.

In some embodiments, the server 102 may include one or more general-purpose computers, specialized server computers such as PC (personal computer) servers, UNIX servers and mid-range servers, blade servers, mainframe computers, server clusters, or any other appropriate arrangements and/or combinations. The server 102 may include one or more virtual machines for operating virtual operating systems, or other computing architectures involving virtualization, for example, one or more flexible pools which may be virtualized to maintain a logic storage device of a virtual storage device of a server. In some embodiments, the server 102 may operate one or more services or software applications for providing functions described below.

In some embodiments, a computing unit in the server 102 may operate one or more operating systems including any above-mentioned operating systems and any commercially available server operating systems. The server 102 may also operate any one of various additional server application programs and middleware application programs, such as an HTTP server, an FTP server, a CGI server, a JAVA server, a database server, etc.

In some embodiments, the server 102 may include one or more application programs to parse and combine data feedback and/or event update received from the user terminal 101. The server 102 may further include one or more application programs so that data feedback and/or real-time events are displayed by one or more display devices of the user terminal 101.

In some embodiments, the edge device 103 may be a device that provides an access point for a core network to an enterprise or a service provider, which may be, for example, a router, a routing switch, an integrated access device (IAD), a multiplexer, or an access device for a metropolitan area network (MAN) and a wide area network (WAN), etc. In other examples, the edge device 103 may further include, but is not limited to, such as an intelligent router, an intelligent loudspeaker, a network attached storage (NAS), a webcam, a storable network device, a smart watch, a smart TV and a monitor, etc.

It can be understood that the user terminal 101, the server 102 and the edge device 103 may communicate over the network. The network may be any type of network, and may support data communication by using any one of various available protocols. The protocols include but not limited to TCP/IP, SNA and IPX. Only as an example, one or more networks 110 may include Local Area Network (LAN), Ethernet-based Network, Token Ring, Wide Area Network (WAN), Internet, Virtual Network, Virtual Private Network (VPN), Intranet, Extranet, Public Switched Telephone Network (PSTN), Infrared network, wireless network such as Bluetooth and WIFI, and/or any combinations of these and/or other networks.

Figure 2:
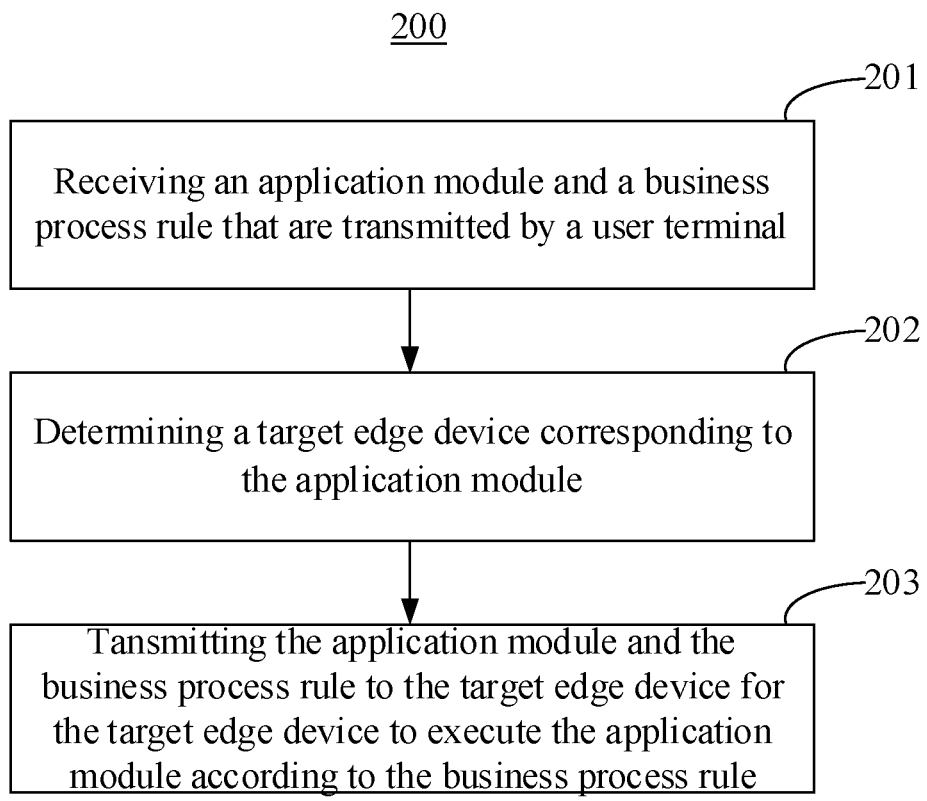
FIG. 2 is a process diagram of a method for arranging business process according to some embodiments of the present disclosure.

FIG. 2 is a process diagram of a method 200 for arranging business process according to some embodiments of the present disclosure. The method may be executed by a server such as a cloud of an edge computing system. In some embodiments, the following is described with an example in which the server is the cloud of the edge computing system. As shown in FIG. 2, the method 200 may include the following steps 201-203.

In step 201, an application module and a business process rule that are transmitted by a user terminal are received;

in step 201, a target edge device corresponding to the application module is determined; and in step 203, the application module and the business process rule are transmitted to the target edge device, the target edge device executes the application module according to the business process rule.

In some embodiments, the application module may be configured to indicate a processing logic in a link in a business process, and the business process rule may be configured to indicate a processing rule of the application module. The application module and the business process rule that are transmitted by the user terminal are received, the target edge device corresponding to the application module is determined, and the application module and the business process rule are transmitted to the target edge device for the target edge device to execute the application module according to the business process rule. Therefore, the arranging business process of the edge device may be implemented, and it is unnecessary to develop a corresponding program for each business process, so that the development cost is reduced.

In some embodiments, a user may operate the user terminal to upload the application module to the cloud of the edge computing system. The application module may be a logic processing module in a certain link in a business process. In some other embodiments, the user may further operate the user terminal to set the business process rule, such as a processing rank order of the application module, in the cloud of the edge computing system.

In some embodiments, the business process may refer to an overall business logic or process for realizing a certain task. For example, an overall process of body temperature detection may be a business process. In a body temperature detection scenario, the application module may include but not limited to a visual perception module, an infrared acquisition module, a recognition module, a risk evaluation module, an alarm notification module, a display module, etc.

In some embodiments, the business process rule may include: the visual perception module and the infrared acquisition module are called first to obtain data such as body temperature data of a user; then, an AI recognition module is called to recognize a face area such as a forehead area of a shot user; then, the risk evaluation module is called to judge whether the temperature in the forehead area of the user exceeds a threshold; and in response to determining that the temperature exceeds the threshold, the risk evaluation module is triggered to transmit a message for indicating temperature abnormality to the alarm notification module, so that the alarm notification module is triggered to give an alarm after the message for indicating temperature abnormality is received, such as starting a buzzer to give an alarm; and meanwhile, the display module is called in real time to display relevant information of the user and a body temperature thereof in a video way.

In some embodiments, the application module may be uploaded to the cloud of the edge computing system in the following ways: Web page upload, application program interface (API) upload, RESTful interface upload and the like, which are not limited in the present disclosure. The application module may be issued from the cloud of the edge computing system to an edge device in a way such as an MQTT message, a WebSocket and a Hyper Text Transfer Protocol (HTTP).

After receiving the application module and the business process rule that are transmitted by the user terminal, the cloud of the edge computing system may store the application module into an object storage repository or a mirror image repository to form an application set. Meanwhile, the cloud of the edge computing system may also store the business process rule into a business process rule set in a format. In some embodiments, the format includes one or more of JSON, XML and YAML.

In some examples, the cloud of the edge computing system may determine an edge device corresponding to the application module by virtue of identify information of the edge device. In some embodiments of the present disclosure, the method may further include: receiving attribute information of each of a plurality of edge devices reported by the each of the plurality of edge devices, wherein the attribute information comprises an identity of a respective edge device; and storing the identity of each of the plurality of edge devices into a database. In some embodiments, the attribute information includes the identity of the edge device. In some embodiments, the attribute information may further include other information of the edge device, for example, includes, but not limited to, a state of the edge device, operation information of a plurality of modules of the edge device, an IP address of the edge device and a service port. In some embodiments, the cloud of the edge computing system may further monitor and check relevant information of processing states, operation conditions and the like of relevant business processes.

The edge device may be provided or configured with an end program with identify information such as a tag. For example, an image pickup device may be provided with an end program with a visual perception tag, a computing device 1 may be provided with an end program with model recognition and risk evaluation tags, a computing device 2 may be provided with an end program with an alarm notification tag, and a display device may be provided with an end program with a large-size screen tag. Herein, it can be understood that the image pickup device, the computing device 1, the computing device 2 and the display device are all examples of the edge device. Correspondingly, the tag of the image pickup device may show visual perception, the tag of the computing device 1 may show model recognition and risk evaluation, the tag of the computing device 2 may show alarm notification, and the tag of the display device may show a large-size screen.

The application module may carry a tag of the corresponding edge device, then, the target edge device corresponding to the application module may be determined according to the tag carried by the application module and a tag of the edge device itself. In some examples, the determining of the target edge device corresponding to the application module includes: determining an identity of an edge device corresponding to the application module; and determining the target edge device according to the identity of the edge device corresponding to the application module and identities of the plurality of edge devices stored in the database. Therefore, the edge device corresponding to the application module may be accurately determined according to the identity such as the tag, thereby improving the accuracy and increasing the efficiency.

It can be understood that the target edge device corresponding to the application module may be one or more edge devices, such that the one or more edge devices are matched with each other to implement corresponding business processes. For example, in a business process for body temperature detection, the edge device may include an image pickup device, a display device and an alarm device. The image pickup device, the display device and the alarm device may be matched with each other to implement relevant business processes for body temperature detection.

After receiving the application module and the business process rule that are transmitted by the cloud of the edge computing system, the edge device may parse the business process rule to correspondingly execute the application module according to the parsed business process rule so as to implement relevant business processes. Embodiments of the present disclosure further provide a method for arranging business process which may be executed by, for example, an edge device.

Figure 3:
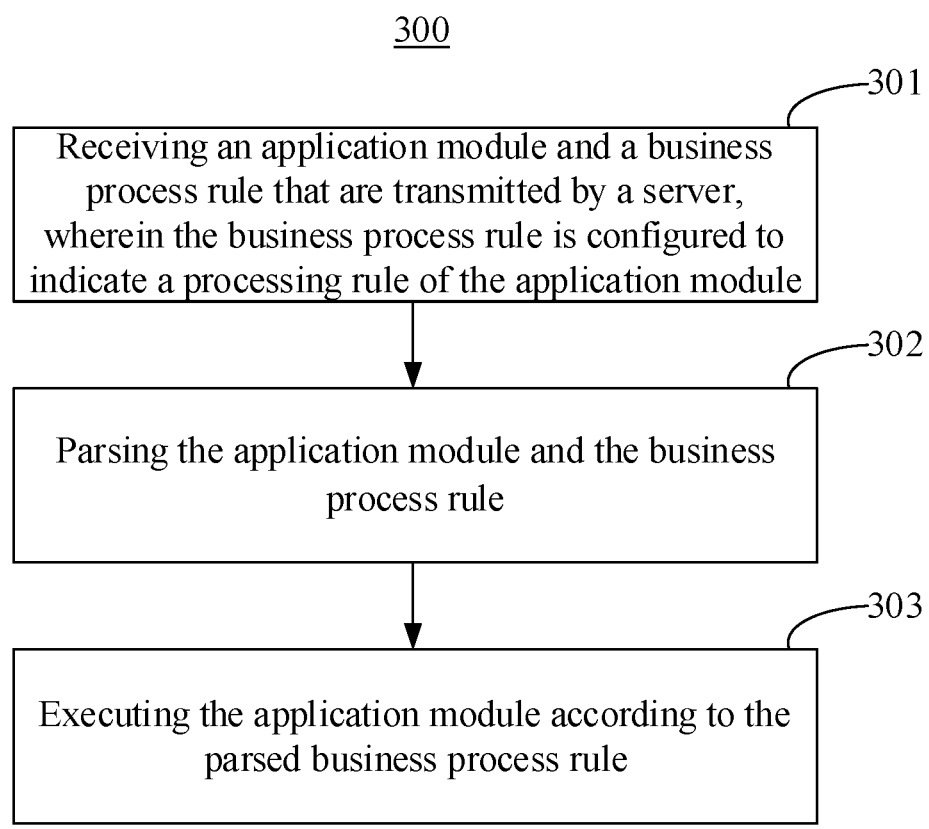
FIG. 3 is a process diagram of a method for arranging business process according to some embodiments of the present disclosure.

FIG. 3 is a process diagram of a method 300 for arranging business process according to some embodiments of the present disclosure. As shown in FIG. 3, the method 300 may include the following steps 301-303.

In step 301, an application module and a business process rule that are transmitted by a server are received, wherein the business process rule is configured to indicate a processing rule of the application module;

in step 302, the business process rule and the application module are parsed; and in step 303, the application module is executed according to the parsed business process rule.

Therefore, by receiving the application module and the business process rule that are transmitted by the server such as a cloud of an edge computing system, the business process may be implemented without developing a corresponding program for the business process, so that the development cost is reduced.

After receiving the application module and the business process rule that are transmitted by the cloud of the edge computing system, the edge device may store the application module and the business process rule. In some embodiments, the edge device may store the application module in a first format, and the first format may include, for example, an executable program and/or a mirror image. The edge device may store the business process rule in a second format, and the second format may include, for example, one or more of a text, a data table and a key-value pair.

In some embodiments, the parsing of business process rule may include: parsing the application module to obtain a processing logic indicated by the application module; and parsing the business process rule to obtain a processing rank order of the application module.

In some embodiments, in relevant business processes of body temperature detection, the application module may include a visual perception module, an infrared acquisition module, a recognition module, a risk evaluation module, an alarm notification module, a display module and the like. The edge device may parse the visual perception module, the infrared acquisition module, the recognition module, the risk evaluation module, the alarm notification module, the display module and the like so as to determine the corresponding processing logic.

In some examples, the executing of the application module according to the parsed business process rule includes: executing the processing logic indicated by the application module according to the processing rank order of the application module. The edge device may be configured with a corresponding end program. For example, the end program may include an edge-cloud synchronization unit, an information reporting unit, a process engine unit, a scheduling unit, a communication unit and the like, and each unit has a corresponding function, so that the business process can be implemented. In some embodiments, the edge-cloud synchronization unit may be configured to receive the application module and the business process rule from the cloud of the edge computing system, the information reporting unit may be configured to report relevant information of the edge device to the cloud of the edge computing system, the process engine unit may be configured to parse the business process rule, the scheduling unit may be configured to call the relevant application module to execute the corresponding processing logic according to the parsed business process rule, and the communication unit may be configured to realize communication between the edge device and other edge devices so as to be matched with the edge device to implement the business process. It can be understood that the target edge device corresponding to the application module may be one or more edge devices, and the one or more edge devices may be configured with corresponding end programs such as an edge-cloud synchronization unit, an information reporting unit, a process engine unit, a scheduling unit, a communication unit and the like, so that corresponding business processes are implemented.

In some embodiments, data transmission among communication units may be implemented by virtue of an MQTT protocol, a Web service, RPC, a WebSocket protocol and the like. The scheduling unit may parse the business process rule by virtue of the process engine unit to obtain a process execution rank order and a data input and output way. The scheduling unit may also complete data transmission and commutation of the scheduling unit in the edge device through the communication unit. The application module is started by the scheduling unit to complete the operation of a business process.

In some embodiments, in relevant business processes of body temperature detection, it is possible to involve a plurality of edge devices such as an image pickup device, a computing device 1 and a computing device 2 which are matched with each other. In some embodiments, the following is described with an example in which the image pickup device includes an edge-cloud synchronization unit A1, an information reporting unit A2, a process engine unit A3, a scheduling unit A4 and a communication unit A5, the computing device 1 includes an edge-cloud synchronization unit B1, an information reporting unit B2, a process engine unit B3, a scheduling unit B4 and a communication unit B5, and the computing device 2 includes an edge-cloud synchronization unit C1, an information reporting unit C2, a process engine unit C3, a scheduling unit C4 and a communication unit C5. The image pickup device may read a business process rule in a database or a file through the process engine unit A3 and parse the business process rule in a format of JSON, XML or YAML. The scheduling unit A4 may firstly start the visual perception module and the infrared acquisition module to collect data according to the business process rule. The scheduling unit A4 may determine the recognition module for next processing according to the business process rule and the collected data, and meanwhile, information of an IP, a port and the like of the computing device 1 is obtained from a cloud of an edge computing system by the edge-cloud synchronization unit A1 according to the computing device 1 configured in the business process rule. The collected data is transmitted to the computing device 1 by the communication unit A5. The scheduling unit B4 in the computing device 1 may start the recognition module according to the business process rule parsed by the process engine unit B3 so as to recognize a forehead area of a user. The scheduling unit B4 starts the risk evaluation module by using the forehead area and the collected data according to the business process rule to judge whether the body temperature of a human body is normal; in response to determining that the body temperature is normal, the display module is called to display body temperature data of the human body on a display device; and in response to determining that the body temperature is abnormal, the scheduling unit B4 of the computing device 1 may obtain information of an IP and a port of the computing device 2 from the cloud of the edge computing system according to the business process rule and call the scheduling unit C4 in the computing device 2 by using abnormal data, and meanwhile, the display module is called to display the body temperature data of the human body on the display device. After receiving a request, the scheduling unit C4 in the computing device 2 may start an alarm module to give an alarm.

Figure 4:
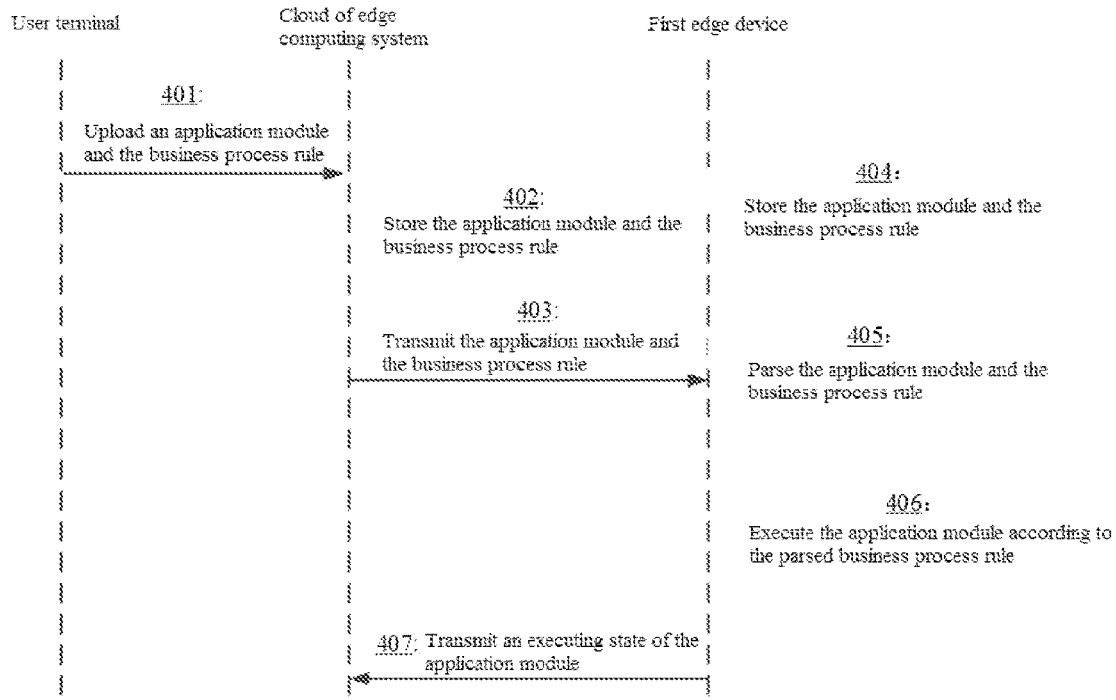
FIG. 4 is a schematic diagram of an interaction between a user terminal, a cloud of an edge computing system and an edge device according to some embodiments of the present disclosure.

FIG. 4 is a schematic diagram of an interaction between a user terminal, a cloud of an edge computing system and a first edge device according to some embodiments of the present disclosure. As shown in FIG. 4, in step 401, the user terminal may pre-configure a business process rule and upload an application module and the business process rule to the cloud of the edge computing system. For example, the user terminal may upload the application module and the business process rule to the cloud of the edge computing system through Web page, API, RESTful interface and the like. In step 402, after receiving the application module and the business process rule that are transmitted by the user terminal, the cloud of the edge computing system may store the application module and the business process rule. For example, the cloud of the edge computing system may store the application module into an object storage repository or a mirror image repository and store the business process rule into a business process rule set. The cloud of the edge computing system may determine a target edge device corresponding to the application module. For example, the cloud of the edge computing system may determine the target edge device according to an identity of the edge device corresponding to the application module. In step 403, after determining the target edge device, the cloud of the edge computing system may transmit the application module and the business process rule to the target edge device such as the first edge device.

In step 404, after receiving the application module and the business process rule that are transmitted by the cloud of the edge computing system, the first edge device may store the application module and the business process rule. For example, the first edge device may store the application module in a way of an executable program and/or a mirror image and store the business process rule in a way such as a text, a data table and a key-value pair. In step 405, the first edge device may parse the business process rule. For example, the first edge device may parse the application module by using a process engine to obtain a processing logic indicated by the application module. The first edge device may further parse the business process rule by using a process engine to obtain a processing rank order of the application module. Next, in step 406, the first edge device may execute the application module according to the parsed business process rule. In some embodiments, in step 407, the first edge device may further transmit an executing state of the application module to the cloud of the edge computing system, so that the cloud of the edge computing system knows the executing state of the application module.

Figure 5:
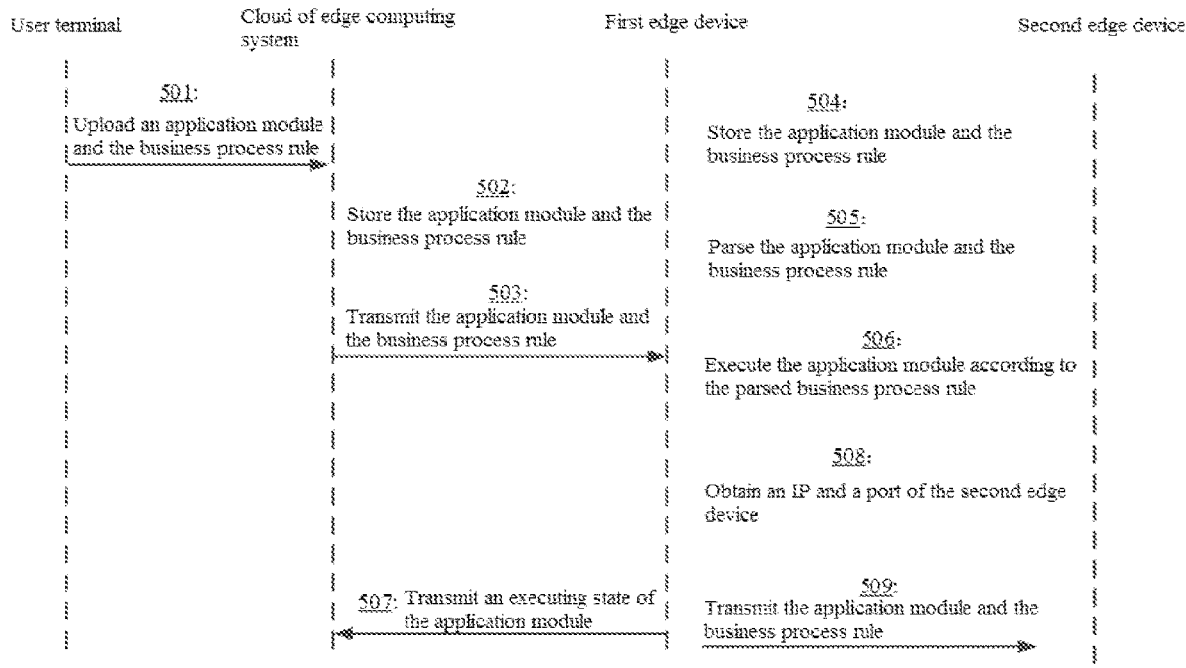
FIG. 5 is a schematic diagram of an interaction between a user terminal, a cloud of an edge computing system and edge devices according to some embodiments of the present disclosure.

It can be understood that the target edge device corresponding to the application module may be one or more edge devices, such that the one or more edge devices are matched with each other to implement corresponding business processes. FIG. 5 is a schematic diagram of an interaction between a user terminal, a cloud of an edge computing system, a first edge device and a second edge device according to some embodiments of the present disclosure. In some embodiments, the interaction between the user terminal, the cloud of the edge computing system and the first edge device in steps 501-507 may be similar to that in steps 401-407 in FIG. 4. In step 508, in response to the first edge device resolving that a business process needs to be executed by other edge devices such as the second edge device, information of an IP, a port and the like of the second edge device may be obtained. In step 509, the relevant application module and business process rule are transmitted to the second edge device, so that the second edge device implements corresponding business processes.

Figure 6:
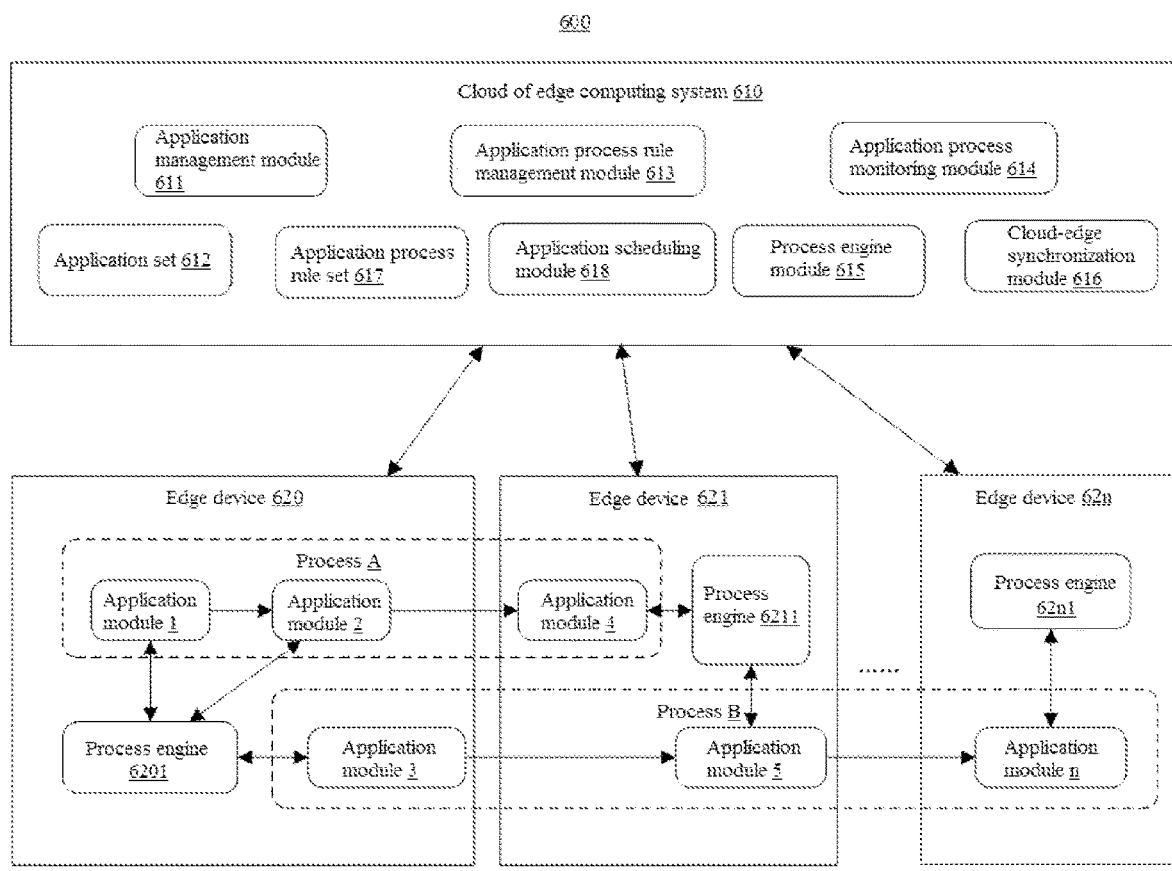
FIG. 6 is a schematic block diagram of a system for arranging business process according to some embodiments of the present disclosure.

FIG. 6 is a schematic block diagram of a system 600 for arranging business process according to some embodiments of the present disclosure. As shown in FIG. 6, the system 600 may include a server 610 such as a cloud of an edge computing system, and one or more edge devices such as an edge device 620, an edge device 621, . . . , and an edge device 62n.

The server 610 may include an application management module 611, an application set 612, an application process rule management module 613, an application process monitoring module 614, a process engine module 615, a cloud-edge synchronization module 616, an application process rule set 617 and an application scheduling module 618. The application management module 611 is configured to manage an application module, for example, manage the uploading, inquiring, modification, deletion and setting of the application module. The application set 612 is configured to store the application module. The application process rule management module 613 is configured to arrange and modify an application business process. The application process monitoring module 614 is configured to check and parse a business process. The process engine module 615 is configured to parse a business process rule, call the application module and execute a process such as remote communication. The cloud-edge synchronization module 616 is configured to issue the application module of the cloud of the edge computing system and the business process rule, and report edge information. The application process rule set 617 is configured to store the business process rule. The application scheduling module 618 is configured to start or stop the application module, call the process engine module to parse the business process rule, and communicate among distant scheduling modules.

The edge devices may parse business processes by virtue of a process engine and call the corresponding application modules to implement the business processes. In some embodiments, the edge device may further interact with other edge devices so as to cooperatively implement corresponding business processes such as a business process A and a business process B. In some embodiments, the edge device 620 may parse business processes by virtue of a process engine 6201 and call corresponding application modules 1-3 to implement the business processes. The edge device 620 may parse business processes by virtue of the process engine 6201 and call corresponding application modules 4-5 to implement the business processes. The edge device 621 may parse business processes by virtue of a process engine 6211 and call the corresponding application module 4 and the corresponding application module 5 to implement the business processes. The edge device 62n may parse business processes by virtue of a process engine 62n1 and call corresponding application modules n to implement the business processes.

Figure 7:
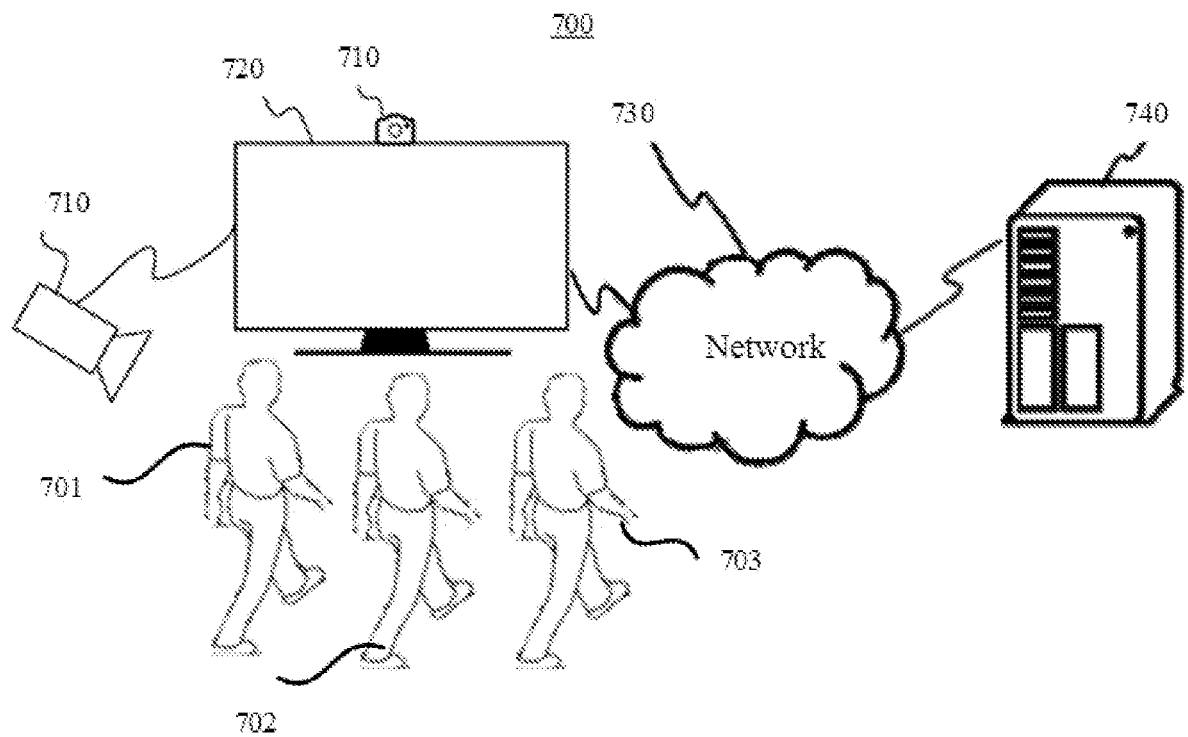
FIG. 7 is a schematic block diagram of a business process based on body temperature detection according to some embodiments of the present disclosure.

FIG. 7 is a schematic diagram of an application scenario 700 of a business process for body temperature detection according to some embodiments of the present disclosure. As shown in FIG. 7, the application scenario may include an image pickup device 710, a computing device 720 and a server 740. The server 740 such as a cloud of an edge computing system may transmit an application module and a business process rule which are relevant to body temperature detection to the image pickup device 710 by virtue of a network 730. The image pickup device 710 may execute corresponding business processes according to the application module and the parsed business process rule, such as collecting relevant data of body temperatures of users 701-703. The image pickup device 710 may transmit the relevant data to the computing device 720 so as to implement the corresponding business processes. The computing device 720 may display the relevant data of the body temperatures of the users 701-703 on a display screen. Therefore, through the cooperation of the image pickup device 710, the computing device 720 and the server 740, the business processes relevant to body temperature detection are implemented.

Figure 8:
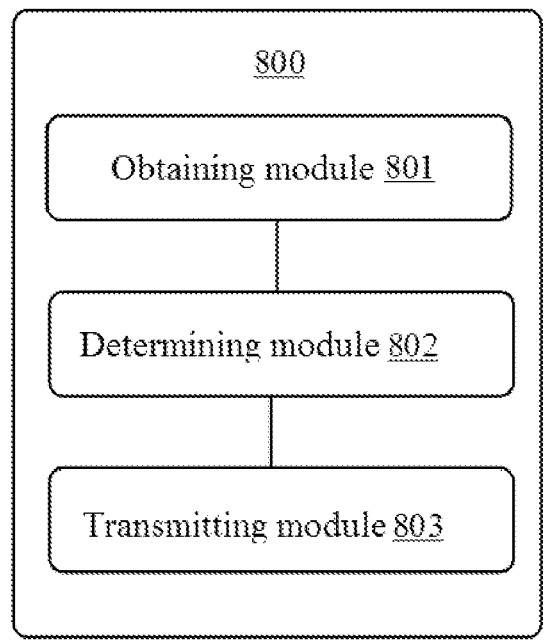
FIG. 8 is a schematic block diagram of an apparatus for arranging business process according to some embodiments of the present disclosure.

FIG. 8 is a schematic block diagram of an apparatus 800 for arranging business process according to some embodiments of the present disclosure. As shown in FIG. 8, the apparatus 800 may include an obtaining module 801, a determining module 802 and a transmitting module 803.

The obtaining module 801 is configured to receive an application module and a business process rule that are transmitted by a user terminal. The application module is configured to indicate a processing logic in a link in a business process, and the business process rule is configured to indicate a processing rule of the application module. The determining module 802 is configured to determine a target edge device corresponding to the application module. The transmitting module 803 is configured to transmit the application module and the business process rule to the target edge device for the target edge device to execute the application module according to the business process rule.

In some examples, operations of the obtaining module 801, the determining module 802 and the transmitting module 803 respectively correspond to the steps 201-203 of the above-mentioned method 200 described in FIG. 2, and therefore, the detailed descriptions thereof are omitted herein. Therefore, the arranging business process of an edge device may be implemented without developing a corresponding program for each business process, so that the development cost is reduced.

Figure 9:
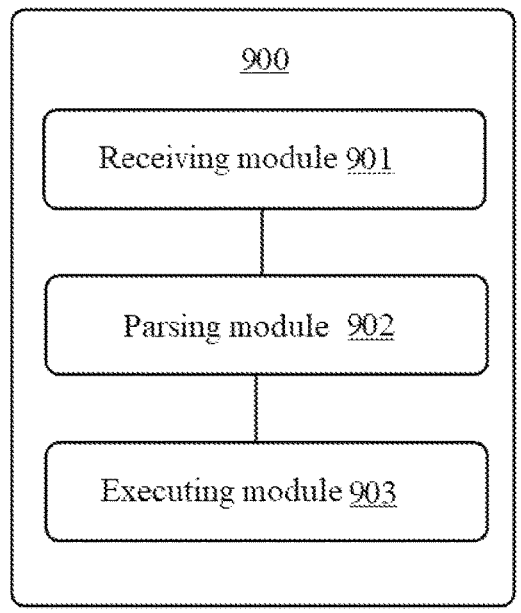
FIG. 9 is a schematic block diagram of an apparatus for arranging business process according to some embodiments of the present disclosure.

FIG. 9 is a schematic block diagram of an apparatus 900 for arranging business process according to some embodiments of the present disclosure. As shown in FIG. 9, the apparatus 900 may include a receiving module 901, a parsing module 902 and an executing module 903.

The receiving module 901 is configured to receive an application module and a business process rule that are transmitted by a server, wherein the business process rule is configured to indicate a processing rule of the application module. The parsing module 902 is configured to parse the business process rule. The executing module 903 is configured to execute the application module according to the parsed business process rule.

In some examples, operations of the receiving module 901, the parsing module 902 and the executing module 903 respectively correspond to the steps 301-303 of the above-mentioned method 300 described in FIG. 3, and therefore, the detailed descriptions thereof are omitted herein. Therefore, the arranging business process of an edge device may be implemented without developing a corresponding program for each business process, so that the development cost is reduced.

Although specific functions are discussed by reference to the specific modules as above, it should be noted that the function of each module discussed herein may be divided into a plurality of modules, and/or at least some functions of the plurality of modules may be combined into a single module. A specific module executing an action discussed herein includes the specific module itself executing the action, or alternatively another component or module called or accessed in other ways by the specific module to execute the action (or execute the action in combination with the specific module). Therefore, the specific module executing the action may include the specific module itself executing the action and/or another module called or accessed in other ways by the specific module to execute the action.

Some embodiments of the present disclosure further provide a system for arranging business process. The system includes a server and an edge device. The server may be configured to execute the method such as the method 200 provided according to some embodiments of the present disclosure, and the edge device may be configured to execute the method such as the method 300 provided according to some embodiments of the present disclosure. The server interacts with the edge device through a protocol.

Some embodiments of the present disclosure further provide a computing device, including one or more processors; and a memory storing one or more programs configured to be executed by the one or more processors. The one or more processors is configured to execute the one or more programs so as to implement the method such as the method 200 provided according to some embodiments of the present disclosure.

Some embodiments of the present disclosure further provide a computing device, including one or more processors; and a memory storing one or more programs configured to be executed by the one or more processors. The one or more processors is configured to execute the one or more programs so as to implement the method such as the method 300 provided according to some embodiments of the present disclosure.

Some embodiments of the present disclosure further provide a non-transitory computer readable storage medium, having one or more computer programs stored thereon. When the one or more computer programs are executed by one or more processors of an electronic device, the method such as the method 200 provided according to some embodiments of the present disclosure is implemented.

Some embodiments of the present disclosure further provide a non-transitory computer readable storage medium, having one or more computer programs stored thereon. When the one or more computer programs are executed by one or more processors of an electronic device, the method such as the method 300 provided according to some embodiments of the present disclosure is implemented.

Some embodiments of the present disclosure further provide a computer program product, including one or more computer programs. When the one or more computer programs are executed by one or more processors, the method such as the method 200 provided according to some embodiments of the present disclosure is implemented.

Some embodiments of the present disclosure further provide a computer program product, including one or more computer programs. When the one or more computer programs are executed by one or more processors, the method such as the method 300 provided according to some embodiments of the present disclosure is implemented.

Examples of such an electronic device and a computer readable storage medium will be described by reference to FIG. 10.

Figure 10:
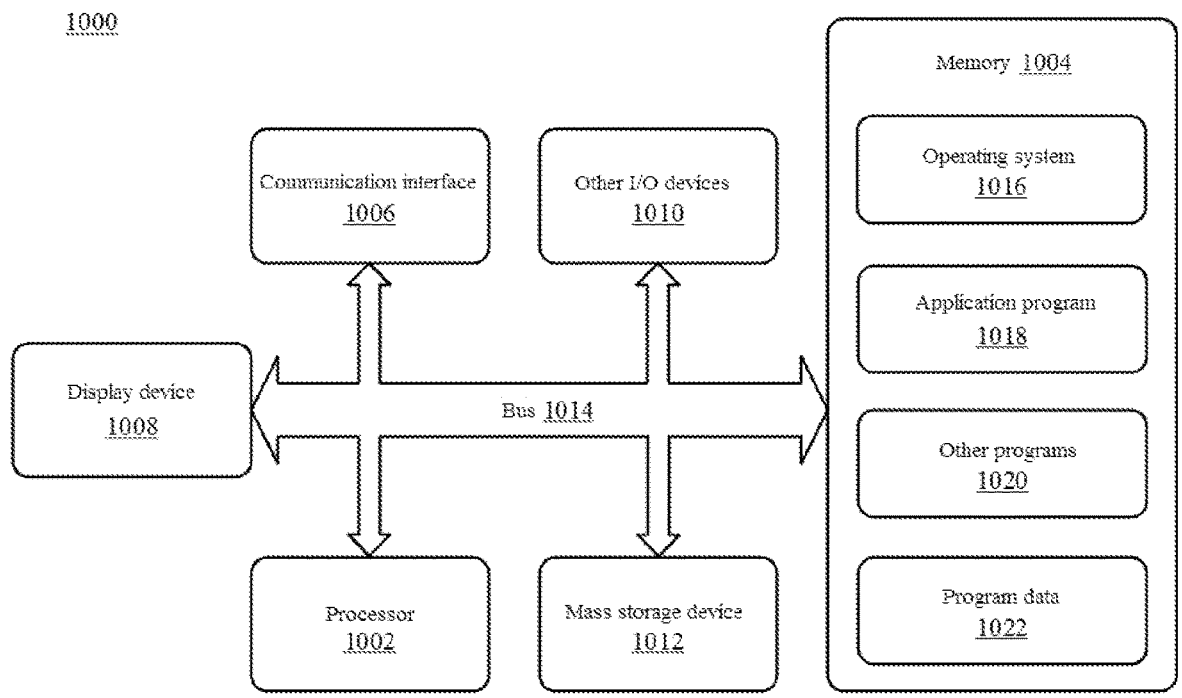
FIG. 10 is a schematic block diagram of a computing device according to some embodiments of the present disclosure.

FIG. 10 shows an example configuration of a computing device 1000 serving as an electronic device which may be configured to implement the modules and functions described herein. The computing device 1000 may be a variety of different types of devices, such as a server of a service provider, a device relevant to a user terminal (such as a client device), a system on chip, and/or any other appropriate computing devices or systems. Examples of the computing device 1000 include, but are not limited to: a desk computer, a server computer, a notebook computer or netbook computer, a mobile device (such as a tablet computer or a phablet device, a cellular or other radiotelephones (such as a smart phone), a notepad computer and a mobile station), a wearable device (such as spectacles and a watch), an entertainment device (such as an entertainment instrument, a set top box communicatively coupled to a display device and a game machine), a television or other display devices, an automobile computer and the like. Therefore, the computing device 1000 may range from a full-resource device (such as a personal computer and a game console) with extensive memory and processor resources to a low-resource device (such as a traditional set top box and a handheld game console) with limited memory and/or processing resources.

The computing device 1000 may include at least one processor 1002, a memory 1004, (a plurality of) communication interfaces 1006, a display device 1008, other input/output (I/O) devices 1010 and one or more mass storage devices 1012, which are capable of communicating with each other, such as through a system bus 1014 or other appropriate connections.

The processor 1002 may be single processing unit or a plurality of processing units, and each of the processing units may include single or a plurality of computing units or a plurality of cores. The processor 1002 may be implemented as one or more microprocessors, microcomputers, microcontrollers, digital signal processors, central processing units, state machines, logic circuits and/or any devices for maneuvering signals based on operation instructions. In addition to other capacities, the processor 1002 may be configured to obtain and execute a computer readable instruction, such as a program code of an operating system 1016, a program code of an application program 1018 and program codes of other programs 1020, stored in the memory 1004, the mass storage device 1012 or other computer readable media.

The memory 1004 and the mass storage device 1012 are examples of a computer storage medium configured to store an instruction, and the instruction is executed by the processor 1002 to achieve various functions described as above. For example, the memory 1004 may generally include a volatile memory and a non-volatile memory (such as RAM and ROM). In addition, the mass storage device 1012 may generally include a hard disk drive, a solid state drive, a removable medium, an external and removable drive, a memory card, a flash memory, a flexible disk, an optical disk (such as a CD and a DVD), a memory array, a network attached memory, a storage area network and the like. Both the memory 1004 and the mass storage device 1012 may be collectively referred to herein as memories or computer storage media and may be non-transitory media capable of storing a computer readable and processor-executable program instruction as a computer program code, and the computer program code may be executed by the processor 1002 as a specific machine configured to implement the operations and functions described in the examples herein.

A plurality of program modules may be stored on the mass storage device 1012. These programs include an operating system 1016, one or more application programs 1018, other programs 1020 and program data 1022, and they may be uploaded into the memory 1004 so as to be executed. Examples of such application programs or program modules may include, for example, computer program logics (such as computer program codes or instructions) for achieving the following components/functions: an obtaining module 801, a determining module 802 and a transmitting module 803, a receiving module 901, a parsing module 902 and an executing module 903, a method 200, a method 300 and/or other embodiments described herein.

Although being illustrated to be stored in the memory 1004 of the computing device 1000 in FIG. 10, modules 1016, 1018, 1020 and 1022 or parts thereof may be implemented by any form of computer readable medium accessed by the computing device 1000. As used herein, the "computer readable medium" at least includes two types of computer readable media, that is, a computer storage medium and a communication medium.

The computer storage medium includes volatile, nonvolatile, removable and non-removable media implemented by using any methods or technologies for storing information, and the information may be, for example, a computer readable instruction, a data structure, a program module or other data. The computer storage medium includes, but is not limited to an RAM, an ROM, an EEPROM, a flash memory or other memory technologies, a CD-ROM, a digital versatile disc (DVD), or other optical storage apparatuses, a magnetic box, a magnetic tape, a magnetic disk storage apparatus or other magnetic storage devices, or any other non-delivery media which may be configured to store information for allowing to be accessed by a computing device.

In some embodiments, the communication medium may specifically implement a computer readable instruction, a data structure, a program module or other data in modulated data signals such as carrier waves or other delivery mechanisms. The computer storage medium defined herein does not include the communication medium.

The computing device 1000 may further include one or more communication interfaces 1006 for exchanging data with other devices, such as by a network, direct connection, etc., as previously discussed. Such communication interfaces may be one or more of the following: any type of network interface (such as a network interface card (NIC)), a wired or wireless (such as IEEE 802.11 wireless LAN (WLAN)) interface, a worldwide interoperability for microwave access (Wi-MAX) interface, an Ethernet interface, a universal serial bus (USB) interface, a cellular network interface, a Bluetooth™ interface, a near field communication (NFC) interface and the like. The communication interfaces 1006 may promote communication in various network and protocol types including a wired network (such as an LAN and a cable) and a wireless network (such as a WLAN, a cell and a satellite), an Internet and the like. The communication interfaces 1006 may further provide communication with an external storage apparatus (unshown) in a memory array, a network attached memory, a storage area network and the like.

In some examples, the display device 1008 such as a monitor configured to display information and images to a user may be included. Other I/O devices 1010 may be devices for receiving various inputs from the user and providing various outputs to the user, and may include a touch input device, a gesture input device, a camera, a keyboard, a remote controller, a mouse, a printer, an audio input/output device and the like.

Although the present disclosure has been explained and described in detail in the accompanying drawings and the foregoing description, such explanation and description should be regarded to be illustrative and schematic and not restrictive. The present disclosure is not limited to the disclosed embodiments. Through research on the accompanying drawings, the summary and the appended claims, those skilled in the art can understand and achieve modifications of the disclosed embodiments when putting the claimed subject matter into practice. In the claims, the word "comprising" does not exclude other unlisted elements or steps, the indefinite article "a" or" an" does not exclude more, and the term "a plurality of" means two or two or more. The only fact that certain measures are recorded in mutually different dependent claims does not indicate that a combination of these measures cannot be used to benefit.

The various embodiments described above can be combined to provide further embodiments. Aspects of the embodiments can be modified, if necessary, to to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for arranging business process, comprising:
receiving an application module and a business process rule that are transmitted by a user terminal, wherein the application module is configured to indicate a processing logic in a link in a business process, and wherein the business process rule is configured to indicate a processing rule of the application module;
determining a target edge device corresponding to the application module;
transmitting the application module and the business process rule to the target edge device for the target edge device to execute the application module according to the business process rule,
receiving attribute information of each of a plurality of edge devices reported by the each of the plurality of edge devices, wherein the attribute information comprises an identity of a respective edge device; and
storing the identity of each of the plurality of edge devices into a database,
wherein the determining the target edge device corresponding to the application module comprises:
determining are identity of an edge device corresponding to the application module; and
determining the target edge device according to the identity of the edge device corresponding to the application module and identities of the plurality of edge devices stored in the database.

2. The method according to claim 1, wherein a format of the business process rule is stored in a business process rule set, and wherein the format comprises one or more of JSON, XML and YAML.

3. A method for arranging business process, comprising:
receiving an application module and a business process rule that are transmitted by a server to a target edge device, wherein the business process rule is configured to indicate a processing rule of the application module, and wherein the tar get edge device is determined by the server through following actions:
determining an identity of an edge device corresponding to the application module; and
determining the target edge device according to the identity of the edge device corresponding to the application module and identities of the plurality of edge devices stored in a database;
parsing the application module and the business process rule; and
executing the application module according to the parsed business process rule.

4. The method according to claim 3, wherein the parsing the application module and the business process rule comprises:
parsing the application module to obtain a processing logic indicated by the application module; and
parsing the business process rule to obtain a processing rank order of the application module.

5. The method according to claim 4, wherein the executing the application module according to the parsed business process rule comprises:
executing the processing logic indicated by the application module according to the processing rank order of the application module.

6. The method according to claim 3, further comprising:
storing the application module and the business process rule, wherein the application module is stored in a first format comprising one or more of an executable program and a mirror image, and wherein the business process rule is stored in a second format comprising one or more of a text, a data table and a key-value pair.

7. A system for arranging business process, comprising:
a server, configured to:
receive an application module and a business process rule that are transmitted by a user terminal, wherein the application module is configured to indicate a processing logic in a link in a business process, and wherein the business process rule is configured to indicate a processing rule of the application module;
receive attribute information of each of a plurality of edge devices reposted by the each of the plurality of edge devices, wherein the attribute information comprise an identity of a respective edge device;
store the identity of each of the plurality of edge devices into a database;
determine an identity of an edge device corresponding to the application module;
determine the target edge device according to the identity of the edge device corresponding to the application module and identities of the plurality of edge devices stored in the database; and
transmit the application module and the business process rule to the target edge device for the target edge device to execute the application module according to the business process rule; and
one or more edge devices including the target edge device, wherein each of the one or more edge devices is configured to interact with the server through a protocol, and wherein each of the one or more edge devices is configured to:
receive the application module and the business process rule that are transmitted by the server;
parse the application module and the business process rule; and
execute the application module according to the parsed business process rule.

8. The system according to claim 7, wherein each of the one or more edge devices is configured to:
parse the application module to obtain a processing logic indicated by the application module; and
parse the business process rule to obtain a processing rank order of the application module.

9. The system according to claim 8, wherein each of the one or more edge devices is configured to:

execute the processing logic indicated by the application module according to the processing rank order of the application module.

10. The system according to claim 7, wherein each of the one or more edge devices is further configured to:
store the application module and the business process rule, wherein the application module is stored in a first format comprising one or more of an executable program and a mirror image, and wherein the business process rule is stored in a second format comprising one or more of a text, a data table and a key-value pair.

11. A computing device, comprising:
one or more processors; and
a memory storing one or more programs configured to be executed by the one or more processors, wherein the one or more programs comprise instructions for:
receiving an application module and a business process rule that are transmitted by a user terminal, wherein the application module is configured to indicate a processing logic in a link in a business process, and wherein the business process rule is configured to indicate a processing rule of the application module;
determining a target edge device corresponding to the application module; transmitting the application module and the business process rule to the target edge device for the target edge device to execute the application module according to the business process rule;
receiving attribute information of each of a plurality of edge devices reported by the each of the plurality of edge devices, wherein the attribute information comprises an identity of a respective edge device; and
storing the identity of each of the plurality of edge devices into a database,
wherein the determining the target edge device corresponding to the application module comprises;
determining an identity of an edge device corresponding to the application module; and
determining the target edge device according to the identity of the edge device corresponding to the application module and identities of the plurality of edge devices stored in the database.

12. A computing device, comprising:
one or more processors; and
a memory storing one or more programs configured to be executed by the one or more processors, wherein the one or more programs comprise instructions for:
receiving an application module and a business process rule that are transmitted by a server to a target edge device, wherein the business process rule is configured to indicate a processing rule of the application module, and wherein the target edge device is determined by the server through following actions:
determining an identity of an edge device corresponding to the application module; and
determining the target edge device according, to the identity of the edge device corresponding to the application module and identities of the plurality of edge devices stored in a database;
parsing the application module and the business process rule; and
executing the application module according to the parsed business process rule.

13. The computing device according to claim 12, wherein the one or more programs further comprise instructions for:
parsing the application module to obtain a processing logic indicated by the application module;
parsing the business process rule to obtain a processing rank order of the application module;
executing the processing logic indicated by the application module according to the processing rank order of the application module; and
storing the application module and the business process rule, wherein the application module is stored in a first format comprising one or more of an executable program and a mirror image, and wherein the business process rule is stored in a second format comprising one or more of a text, a data table and a key-value pair.

14. A non-transient computer readable storage medium storing one or more programs, the one or more programs comprising instructions, which when executed by one or more processors of an electronic device, cause the electronic device to:
receive an application module and a business process rule that are transmitted by a user terminal, wherein the application module is configured to indicate a processing logic in a link in a business process, and wherein the business process rule is configured to indicate a processing rule of the application module;
receive attribute information of each of a plurality of edge devices reported by the each of the plurality of edge devices, wherein the attribute information comprises an identity of a respective edge device:
store the identity of each of the plurality of edge devices into a database;
determine an identity of an edge device corresponding to the application module;
determine the target edge device according to the identity of the edge device corresponding to the application module and identities of the plurality of edge devices stored in the database; and
transmit the application module and the business process rule to the target edge device for the target edge device to execute the application module according to the business process rule.

15. A non-transient computer readable storage medium storing one or more programs, the one or more programs comprising instructions, which when executed by one or more processors of an electronic device, cause the electronic device to:
receive an application module and a business process rule that are transmitted by a server to a target edge device, wherein the business process rule is configured to indicate a processing rule of the application module, and wherein the target edge device is determined by the server through following actions:
determining an identity of an edge device corresponding to the application module; and
determining the target edge device according to the identity of the edge device corresponding to the application module and identities of the plurality of edge devices stored in a database;
parse the application module and the business process rule; and
execute the application module according to the parsed business process rule.

* * * * *